United States Patent
Kristensson et al.

(10) Patent No.: US 9,361,854 B2
(45) Date of Patent: Jun. 7, 2016

(54) METHOD FOR STABILIZATION AND A SYSTEM THERETO

(71) Applicant: Sony Corporation, Tokyo (JP)

(72) Inventors: Andreas Kristensson, Södra Sandby (SE); Magnus Persson, Flyinge (SE)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 14/252,083

(22) Filed: Apr. 14, 2014

(65) Prior Publication Data

US 2014/0333526 A1    Nov. 13, 2014

(30) Foreign Application Priority Data

May 13, 2013    (EP) .................................... 13167460

(51) Int. Cl.

| | |
|---|---|
| G06F 5/00 | (2006.01) |
| G09G 5/00 | (2006.01) |
| G09G 5/12 | (2006.01) |
| G06F 3/14 | (2006.01) |
| G02B 27/00 | (2006.01) |
| G06F 3/01 | (2006.01) |
| G09G 5/14 | (2006.01) |

(52) U.S. Cl.
CPC ............ *G09G 5/005* (2013.01); *G02B 27/0093* (2013.01); *G06F 3/1454* (2013.01); *G09G 5/12* (2013.01); *G06F 3/013* (2013.01); *G09G 5/14* (2013.01); *G09G 2320/0261* (2013.01)

(58) Field of Classification Search
CPC ..................................................... G06F 3/013
USPC ....................................................... 345/156
See application file for complete search history.

(56) References Cited

U.S. PATENT DOCUMENTS

| | | | |
|---|---|---|---|
| 7,306,337 B2 * | 12/2007 | Ji et al. ........................... | 351/209 |
| 2011/0298936 A1 * | 12/2011 | Watanabe et al. .......... | 348/208.4 |
| 2012/0038678 A1 * | 2/2012 | Hwang et al. ................. | 345/667 |
| 2012/0146891 A1 | 6/2012 | Kalinli | |
| 2013/0016070 A1 | 1/2013 | Starner et al. | |
| 2013/0044055 A1 * | 2/2013 | Karmarkar et al. ........... | 345/158 |
| 2014/0123162 A1 * | 5/2014 | Karlsson et al. ................ | 725/12 |
| 2014/0269903 A1 * | 9/2014 | McCarthy et al. ........ | 375/240.03 |

FOREIGN PATENT DOCUMENTS

WO    WO 2011/100436 A1    8/2011

OTHER PUBLICATIONS

European Search Report, Application No. 13167460.8, Sep. 2, 2013.
International Preliminary Report on Patentability, Application No. PCT/IB2014/061388, Nov. 17, 2015, 15 pages.

* cited by examiner

*Primary Examiner* — Amare Mengistu
*Assistant Examiner* — Joseph G Rodriguez
(74) *Attorney, Agent, or Firm* — Myers Bigel Sibley

(57) ABSTRACT

A method for stabilization for use in a display system is provided. The method is performed in a first electronic device comprising a first display and a gaze tracking unit configured to track a gaze of a user of the first device. The first device is arranged to send an image signal to the second device. The second device comprises a second display. The method comprises sending the image signal from the first device to the second device, controlling the image signal by the first device, depending on the tracked gaze of the user, displaying the controlled image signal on the second display such that, when the user focuses on an object of a view of the first display, the object of the view on the second display is cropped and stabilized.

15 Claims, 3 Drawing Sheets

METHOD FOR STABILIZATION AND A SYSTEM THERETO

CROSS-REFERENCE TO RELATED APPLICATION

The present application claims priority to European Patent Application No. 13167460.8, filed May 13, 2013, the disclosure and content of which is hereby incorporated by reference as if set forth fully herein.

TECHNICAL FIELD

Embodiments herein relate to methods for stabilization for use in a display system, and to a display system.

BACKGROUND

A modern mobile electronic device often comprises a camera and may be used to create a so called keyhole display. The mobile device and its camera mimics a small keyhole through which a user looks at. A problem that occurs if the keyhole display is to be displayed on a remote display for other users to look at, in real-time or at a later occurrence, is that every little movement of the mobile device, and hence of the camera, will be transferred to the remote display and the keyhole as displayed on the remote display will look jerky and erratic, and it is often difficult to watch for any longer period, i.e. due to motion sickness.

SUMMARY

Even though existing image stabilization techniques may be used to stabilize a view shown as described above, the problems mentioned may still be present. An object of embodiments herein is to provide improved methods for stabilization. In embodiments herein, methods for stabilization for use in a display system is provided. The display system comprises a first electronic device and a second electronic device. The first electronic device comprises a first display and a gaze tracking unit configured to track a gaze of a user of the first device. The first device is arranged to send an image signal to the second device. The second device comprises a second display. In embodiments herein, methods comprises sending the image signal from the first device to the second device, controlling the image signal by a control unit, depending on the tracked gaze of the user, displaying the controlled image signal on the second display such that, when the user focuses on an object of a view of the first display, the object of the view on the second display is cropped and stabilized.

In still other embodiments, the first electronic device comprises a camera unit sending image signals to the first display.

In still other embodiments, image signals received by the camera unit are sent to the second display.

In other embodiments herein, the image signal received by the second electronic device comprises information of a geographical position of an object shown in the first display.

In other embodiments herein, a display system comprising at least a first electronic device and a second electronic device is provided. The first electronic device is arranged to send an image signal to the second electronic device. The first electronic device comprises a first display and a gaze tracking unit configured to track a gaze of a user of the first electronic device. The second electronic device comprises a second display. The system comprises a control unit configured to control the image signal, depending on the tracked gaze of the user, such that, when the user focuses on an object of a view of the first display, the object of the view is cropped and stabilized when displayed on the second display.

In still other embodiments herein, the control unit is comprised in the first electronic device.

In other embodiments herein, the control unit is comprised in the second electronic device.

In other embodiments herein, the first electronic device further comprises a camera unit configured to send image signals to the first display.

In still other embodiments herein, the first electronic device is configured to send image signals to the second display.

In still other embodiments herein, the image signal received on the second display comprises information of a geographical position of an object shown in the first display.

In other embodiments herein, the first electronic device comprises means for determining a geographical position, and the image signal received in the second display comprises information of the geographical position of the first electronic device.

BRIEF DESCRIPTION OF THE DRAWINGS

Examples of embodiments herein are described in more detail with reference to attached drawings in which.

DETAILED DESCRIPTION

Embodiments herein will be exemplified in the following detailed non-limiting description.

Figure 1:
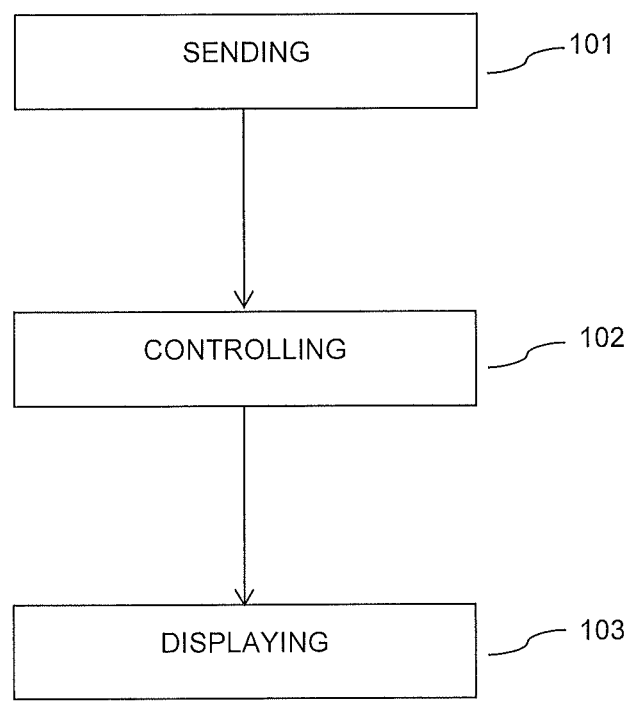
FIG. 1 is a flow chart.
Figure 2:
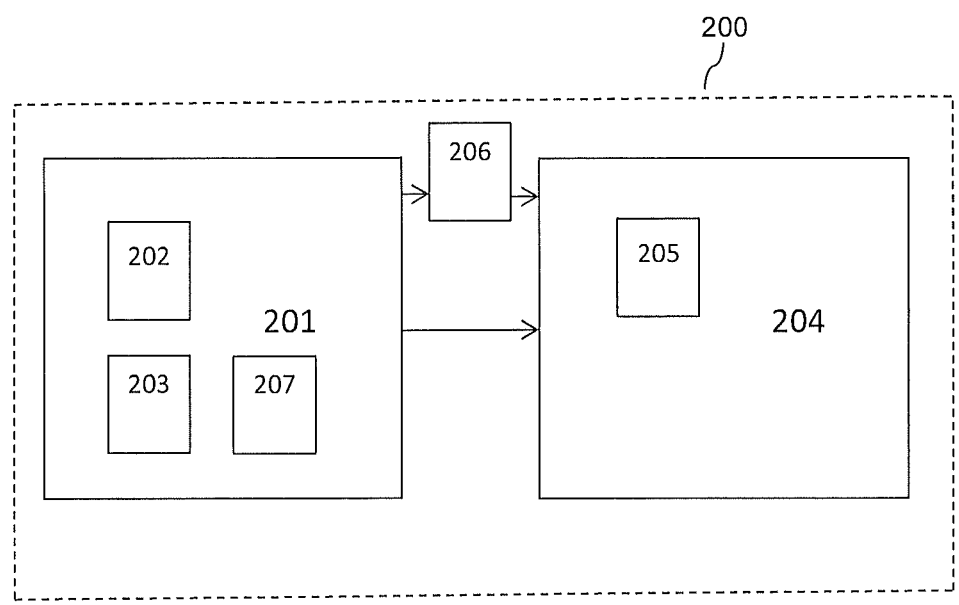
FIG. 2 shows a display system.

With reference to FIGS. 1 and 2, an exemplified method for use in a display system 200 will now be described. A system 200 comprises a first electronic device 201 and a second electronic device 204. The first electronic device 201 may for example be a mobile phone, a tablet or the like. The first electronic device 201 comprises a first display 202 and a gaze tracking unit 203 configured to track a gaze of a user 301 of the first device 201. The gaze tracking unit 203 may be any suitable gaze tracking equipment available. The first device 201 is arranged to send an image signal to the second device 204 comprising a second display 205. The first electronic device 201 comprises a camera unit 207 and a display unit 202 adapted to display image signals received from the camera unit 207. The second electronic device 202 comprises a second display unit 205 for displaying image signals. In an exemplified method a view shown on the second display 205 is controlled by a control unit 206 comprised in the first device 201. The control unit 206 may as well be comprised in the second device 204, or may be provided separately. Controlling depends on the tracked gaze of the user 301. The view is controlled on the second display 205 such that, when the user 301 focuses on an object of a view of the first display 201, the object of the view is cropped and stabilized when displayed on the second display 205. Image signals may be sent from the first electronic device 201 to the second display 205. The first electronic device 201 may comprise a camera unit 207 sending image signals to the first display. The method may further comprise sending image signals received by the camera unit to the second display 205. The image signal received on the second display 205 may comprise information of a geographical position of an object shown in the first display 202.

The method thus utilizes gaze-tracking technique, thus what a user 301 focuses on, for picking out objects of interest and define boundaries for stabilizing a keyhole view as represented by a first electronic device 201 that may be a mobile device or a tablet camera, and a thereto related display, being streamed to and displayed on a remote second display 205 present in a second electronic device 204.

The received image signals may for example be displayed on a part of the display unit of the second electronic device. Another image signals may simultaneously be displayed on the display unit of the second electronic device. Alternatively, the received image may be displayed solely on the display unit of the second electronic device.

Figure 3:
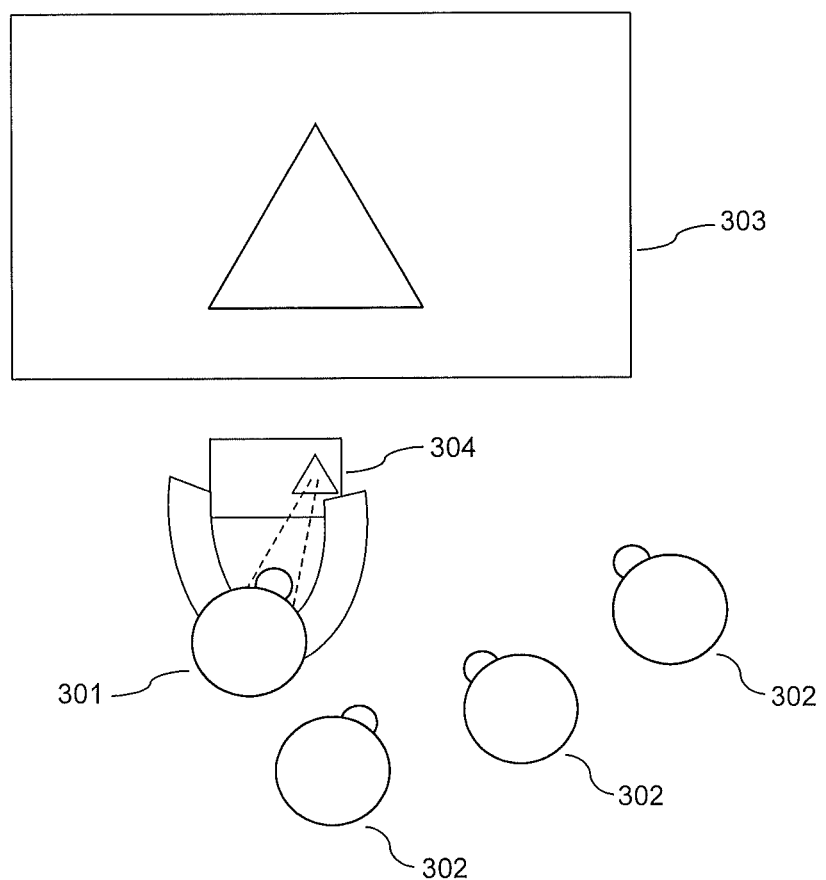
FIG. 3 shows an example of a proposed method.

For example, the specific form of a building, or any other shape shown in the display may be recognized in both devices, and the recognized shape may be used when adapting the image shown in the second device, i.e. by zooming or cutting the view. A possible exemplary use case is shown in FIG. 3. A user 301 is showing a holiday photo of an object for her friends 302 on a TV 303 from a tablet 304. There is a discussion whether there is, for example, a clock on all four sides of the object or only on two. The user 301 raises the tablet 304 which is set to be a trigger of Google Street view and start streaming a modified view of what is shown on the device 304 to the TV 303. Since the photo is geo tagged, the Street View application is started at the location where the photo was taken close to the object and allows panning around by moving the tablet 304 around. Since the user 301 is constantly and eagerly looking at the object on the tablet 304 the device stabilizes the viewing experience on the TV 303 on that part by cropping the view and not showing the entire screen. That makes the viewing experience much better. By adding gaze-tracking, i.e. using mobile device and tablet front-facing camera and tracking the eye's of the user controlling the keyhole, the device will have a better understanding of what the user is actually looking at through the keyhole and thereby be able to define cropping boundaries, that may slowly grow and shrink dynamically based on gaze-tracking input, and that can be used to even further improve image stabilization for the video being streamed to the remote display. Thus, watching the keyhole as displayed on the remote display will then be much more enjoyable.

Now returning to FIG. 2, an example of a display system 200 is shown. The system exemplified comprises a first electronic device 201 and a second electronic device 204. The first electronic device 201 is arranged to send image signals to the second device 204. The first electronic device 201 comprises a camera unit 207, and a first display unit 202 adapted to display image signals received from the camera unit 207. Received image signals may be sent from the first electronic device 201 to the second electronic device 202. The second electronic device 202 comprises a display unit 205 for displaying image signals and a receiving unit for receiving image signals sent by the first electronic device. The system 200 comprises a control unit 206 configured to control a view shown on the second display by the first device, depending on the tracked gaze of the user, which view is controlled on the second display such that, when the user focuses on an object of a view of the first display, the object of the view is cropped and stabilized when displayed on the second display. The control unit 206 may be comprised either in the first electronic device 201, the second electronic device 204, or may be provided separately. The image signal received on the second display 205 may comprise information of a geographical position of an object shown in the first display 202. The first electronic device 201 may comprise means for determining a geographical position, and the image signal received in the second display 205 may comprise information of the geographical position of the first electronic device.

The embodiments herein are not limited to the above described examples. Various alternatives, modifications and equivalents may be used. Therefore, this disclosure should not be limited to the specific form set forth herein. This disclosure is limited only by the appended claims and other embodiments than the mentioned above are equally possible within the scope of the claims.

The invention claimed is:

1. A method for modifying a view in a display system, the display system comprising a first electronic device and a second electronic device, the first electronic device comprising a first display and a gaze tracking unit configured to track a gaze of a user of the first electronic device, the second electronic device comprising a second display, the method comprising:
   displaying an image on the first display, wherein the image is associated with information related to a geographical position of the image;
   receiving an image signal from a remote image service, the image signal corresponding to the geographical position of the image;
   displaying another image associated with the image signal on the first display;
   sending the image signal from the first electronic device to the second electronic device;
   generating a controlled image signal based on the gaze of the user of the first electronic device; and
   displaying a controlled imaged associated with the controlled image signal on the second display, wherein the controlled image is cropped based on the gaze of the user of the first electronic device.

2. The method according to claim 1, wherein the first electronic device comprises a camera unit, the method further comprising:
   sending image signals received by the camera unit to the first display.

3. The method according to claim 2, further comprising:
   sending image signals received by the camera unit to the second display.

4. A method according to claim 1, wherein the receiving the image signal from a remote image service is triggered by a movement of the first electronic device.

5. A method according claim 1, wherein the generating the controlled image signal is performed by the first electronic device.

6. A method according to claim 1, further comprising:
   moving the first electronic device,
   wherein the generating the controlled image signal comprises modifying the image signal based on the movements of the first electronic device.

7. A method according to claim 1, further comprising:
   identifying a keyhole image based on the gaze of the user of the first electronic device, wherein the keyhole image comprises a sub-portion of the image on the first display, wherein the controlled image is cropped to include the keyhole image and exclude a portion of the image not part of the keyhole image.

8. A method for controlling images in a display system, the display system comprising a first electronic device and a second electronic device, the first electronic device comprising a first display and the second electronic device comprising a second display, the method comprising:
   displaying a first image containing information indicative of a geographical position of the first image on the first display;

receiving, at the first electronic device, a second image corresponding to the geographical position of the image;

displaying the second image on the first display;

sending information associated with the first image and/or the second image from the first electronic device to the second electronic device;

displaying a controlled imaged based on the first image and/or the second image.

9. A method according to claim 8, wherein the information related to a geographical position of the image comprises a geotag.

10. A method according to claim 8, wherein the second image corresponding to the geographical position of the first image is received at the first electronic device from a remote image service.

11. A method according to claim 8, further comprising:

changing the physical position of the first electronic device; and receiving the second image from a remote image service in response to changing the physical position of the first electronic device.

12. A method according to claim 8, further comprising:

recognizing a first shape in the first image on the first display;

determining a second shape at the second electronic device based on the information associated with the first image and/or the second image that was received at the second electronic device, wherein the displaying the controlled image based on the first image and/or the second image comprises displaying the controlled image on the second display based on the first shape and the second shape.

13. A method according to claim 12, wherein the recognizing the first shape in the first image is associated with an area associated with the gaze of the user of the first electronic device.

14. A method according to claim 12, wherein the displaying the controlled image on the second display comprises zooming in on the second shape based on the first shape.

15. A method according to claim 12, wherein the displaying the controlled image on the second display comprises cropping on the second shape based on the first shape.

* * * * *